(12) United States Patent
Verso et al.

(10) Patent No.: US 11,252,687 B2
(45) Date of Patent: Feb. 15, 2022

(54) REMOTE SIGNAL SYNCHRONIZATION

(71) Applicant: Decawave, Ltd., Dublin (IE)

(72) Inventors: Billy Verso, Maynooth (IE); Michael McLaughlin, Dublin (IE)

(73) Assignee: QORVO US, INC., Greensboro, NC (US)

(*) Notice: Subject to any disclaimer, the term of this patent is extended or adjusted under 35 U.S.C. 154(b) by 27 days.

(21) Appl. No.: 16/492,536

(22) PCT Filed: Mar. 9, 2018

(86) PCT No.: PCT/EP2018/055983
§ 371 (c)(1),
(2) Date: Sep. 9, 2019

(87) PCT Pub. No.: WO2018/162753
PCT Pub. Date: Sep. 13, 2018

(65) Prior Publication Data
US 2020/0045661 A1 Feb. 6, 2020

(30) Foreign Application Priority Data
Mar. 9, 2017 (GB) .................................... 1703796

(51) Int. Cl.
*H04W 56/00* (2009.01)
*H04J 3/06* (2006.01)
*H04W 84/20* (2009.01)

(52) U.S. Cl.
CPC ....... *H04W 56/0015* (2013.01); *H04J 3/0667* (2013.01); *H04W 56/0065* (2013.01); *H04W 84/20* (2013.01)

(58) Field of Classification Search
None
See application file for complete search history.

(56) References Cited

U.S. PATENT DOCUMENTS

| 2008/0152046 | A1 | 6/2008 | Armstrong | |
| 2009/0059962 | A1* | 3/2009 | Schmidt | H04N 21/4307 370/503 |
| 2013/0023285 | A1* | 1/2013 | Markhovsky | G01S 5/0215 455/456.1 |

(Continued)

FOREIGN PATENT DOCUMENTS

| EP | 2736274 A2 | 5/2014 |
| WO | 2005013047 A2 | 2/2005 |
| WO | 2014043405 A1 | 3/2014 |

OTHER PUBLICATIONS

Intention to Grant for European Patent Application No. 18710847.7, dated May 12, 2021, 5 pages.

(Continued)

*Primary Examiner* — Hong Shao
(74) *Attorney, Agent, or Firm* — Withrow + Terranova, P.L.L.C.

(57) ABSTRACT

A method of synchronizing signals is disclosed. The method comprises using a clock tracking system to convert a future event target time specified in a time base of a master device into the local unsynchronized time bases of one or more slave devices. Each of the slave devices then generates an event signal at the converted time, such that a coordinated delivery of synchronized signals is achieved.

29 Claims, 4 Drawing Sheets

(56) References Cited

U.S. PATENT DOCUMENTS

2015/0103817 A1* 4/2015 Kuhn .................... H04W 56/00
370/350
2015/0131645 A1 5/2015 Reunamaki

OTHER PUBLICATIONS

International Search Report and Written Opinion for International Patent Application No. PCT/EP2018/055983, dated Jun. 7, 2018, 12 pages.
International Preliminary Report on Patentability for International Patent Application No. PCT/EP2018/055983, dated Sep. 10, 2019, 8 pages.

* cited by examiner

REMOTE SIGNAL SYNCHRONIZATION

This application is a national stage entry of and related to PCT Application Serial No. PCT/EP2018/055983 ("PCT Application"), and is related to United Kingdom Application Serial No. 1703796.1.

This application claims priority to the PCT Application, and hereby claims benefit of the filing dates thereof pursuant to 37 CFR § 1.78(a)(4). This application further claims priority to United Kingdom Application Serial No. 1703796.1.

The subject matter of the PCT Application and United Kingdom Application Serial No. 1703796.1, in their entireties, are expressly incorporated herein by reference.

The present invention relates to systems and methods for synchronization between a master device and one or more slave devices.

Improvements in wireless communication technology have led to a proliferation of wirelessly connected devices. Rather than merely connecting (e.g. via wireless access points) to the Internet, new products, services and functionalities can be provided by allowing efficient communication between such devices (for example in home automation). Computing devices such as games consoles or virtual reality systems often rely on wireless communication between the master device and wireless input devices and display devices (e.g. VR headsets). Such systems provide real-time experiences that often require precise coordination between components. There is therefore an increasing need for effective synchronization methods for wirelessly connected devices.

Accordingly, in a first aspect of the invention, there is provided a method of synchronizing signals, comprising: using a clock tracking system to convert a future event target time specified in a time base of a master device into the local unsynchronized time bases of one or more slave devices; and generating, by the or each slave device, an event signal at the converted time, preferably such that a coordinated delivery of synchronized signals is achieved.

A time base is preferably a timing context in which time information is expressed. The time base of a device may be defined by a clock (or other time signal source) of the device, which the device uses to measure and record time values, and thus times expressed in a given time base are expressed in relation to the device's clock (or other time signal source). For example, times in the master time base are times that are measured and expressed in relation to the master clock and times in the slave time base are times measured and expressed in relation to the slave clock. Thus, the concepts of times expressed in a particular time base, or expressed relative to a particular clock, are generally used interchangeably herein.

The time bases (i.e. clocks) of the slave devices are preferably unsynchronized with respect to each other and/or with respect to the master time base.

Preferably, the method comprises converting the future event target time into the local unsynchronized time bases of a plurality of slave devices, the generating step performed by each slave device. The conversion is preferably performed using the clock tracking system at each slave device based on a respective local clock of the slave device.

The clock tracking system may comprise a Kalman filter, digital phase-locked loop (PLL) or linear interpolation.

The method may comprise taking into account the individual propagation times (e.g. time of flight) between the master device and the slave devices. The propagation times may be measured frequently to correct for their variation as conditions change. Two-way ranging techniques may be used to measure the propagation times.

Preferably, the method comprises receiving a clock calibration message at a slave device from the master device, the clock calibration message comprising a transmission timestamp indicating a transmission time of the clock calibration message in the time base of the master device (expressed in relation to the master clock).

The method may comprise determining, at the slave device, a reception timestamp in the slave device's time base (expressed in relation to the slave clock) indicating a time of reception of the calibration message. The method preferably comprises using the transmission timestamp and the reception timestamp to determine a conversion between the time base of the master device and the time base of the slave device and using the determined conversion to convert the future event target time. The determined conversion may comprise any information or algorithm defining a mapping between times expressed in one time base (in relation one device's clock) to times expressed in another time base (in relation to another device's clock). For example the conversion may comprise a timing offset which can be added to/subtracted from time values in one time base to convert them to another time base, or the conversion may comprise a state of an estimator such as a Kalman filter as described further below.

A plurality of clock calibration messages with respective transmission timestamps may be received, with the method determining respective reception timestamps for each clock calibration message, and determining the conversion using the plurality of transmission timestamps and reception timestamps.

Preferably, the method further comprises determining the conversion based on a time-of-flight, TOF, value indicating a time for the clock calibration message to travel from the master device to the slave device (propagation time). The method may comprise correcting transmission or reception timestamps based on the TOF value, e.g. subtracting the TOF value from the reception timestamp or adding the TOF value to the transmission timestamp, and analysing the resulting timestamps to determine a conversion or mapping which maps time values between the master and slave time bases.

The conversion may be based on an estimation algorithm, preferably a Kalman filter, the method comprising determining the conversion by providing one or more transmission timestamps in the master time base and one or more corresponding reception timestamps in the slave time base as input to the estimation algorithm, preferably after modifying either the transmission timestamp(s) or the reception timestamp(s) based on a TOF value. Converting the future event target time may then comprise providing the future event target time as input to the estimation algorithm, the estimation algorithm calculating a corresponding event target time in the time base of the slave device.

The TOF value may be determined based on a ranging exchange between the master device and the slave device. The clock calibration message may be embedded in a message transmitted as part of the ranging exchange.

The method may comprise computing the future event target time based on a predetermined target time delay, TTD, value, wherein the TTD value specifies a time offset relative to the transmission timestamp of a clock calibration message, the computing preferably comprising adding the TTD value to the transmission timestamp to determine the future event target time; and converting the computed future event target time to the slave device's time base. The future event target time may alternatively comprise a predetermined absolute time value in the master device's time base. The future event target time or TTD value may be pre-configured at the slave device and/or communicated to the slave device by the master device.

The event signal may be generated periodically at the slave device(s), the future event target time determined based on the signal period and/or a previous signal output time.

The master clock may update at a given frequency determining a time interval between successive clock increments, the method comprising providing to the slave device(s) additional timing information at greater time resolution (e.g. as a set of least-significant bits for a timing signal), indicating an offset with respect to values of the master clock, and determining the future event target time and/or the converted time using the additional timing information. The offset may be added before or after conversion.

The method may comprise configuring, in advance of the converted future time, a signal interface at the slave node to generate the event signal at the converted future time.

The method may comprise determining respective different future event target times at each of a plurality of slave devices, optionally as time offsets relative to a single future target time value, and performing the conversion and generating steps at each slave device based on the respective future event target time for the slave device to generate event signals at respective different converted event times.

The method may also comprise performing an action or generating a local event signal at the master device at the future event target time, whereby the action or signal is synchronized with the generation of event signals at the slave device(s).

The method may comprise, by a slave device (or each slave device), outputting the event signal to a processor of the slave device.

The master device is preferably remote from, and/or connected wirelessly to, the slave devices. The method may be used in a wireless system, optionally using ultra-wideband (UWB) radio.

In a further aspect of the invention (which may be combined with the above aspect), there is provided a method performed at a slave device comprising: receiving, at the slave device, a synchronization message from a master device, the synchronization message comprising a transmission timestamp indicating time of transmission of the message from the master device, wherein the transmission timestamp is generated at the master device based on a master clock at the master device; determining a reception timestamp indicating a reception time of the synchronization message at the slave device, the reception time measured with respect to a slave clock of the slave device; determining a conversion between time values expressed relative to the master clock and time values expressed relative to the slave clock based on the transmission and reception timestamps; converting a future event target time specified relative to the master clock to a target time value relative to the slave clock using the determined conversion; and performing an action at the slave device at the event target time based on the converted target time value.

Preferably, performing an action comprises generating a predetermined output signal at the event target time.

The determining and conversion steps preferably utilise a parameter estimation algorithm, preferably a Kalman filter. The conversion may be determined further based on a message propagation time between the master device and the slave device.

The future event target time may be based on a target time delay value and the transmission timestamp of the synchronization message. The converting step may determine a time value at a first time resolution, the method comprising adding a time offset at a second, greater time resolution to the time value to determine the target event time.

The method may comprise configuring, in advance of the converted event target time, an output interface at the slave node to generate an output signal at the converted event target time.

The method according to this aspect may include performing any method as set out above in relation to the first aspect of the invention.

In a further aspect (which may be combined with any of the above aspects), the invention provides a slave device adapted to communicate with a master device, the slave device comprising: a slave device clock providing a time signal defining a slave time base; a receiver configured to: receive a synchronization message from the master device, the synchronization message comprising a transmission timestamp indicating time of transmission of the message from the master device, wherein the transmission timestamp is generated at the master device based on a master device clock defining a master time base of the master device; and determine a reception timestamp indicating a reception time of the synchronization message at the slave device, the reception time measured with respect to the slave device clock; the slave device further comprising processing means configured to: determine a conversion between the time bases of the master device and slave device based on the transmission and reception timestamps; and convert a future event target time specified in a time base of the master device to a target time value in the time base of the slave device using the determined conversion; the slave device configured to perform a predetermined action at the event target time in accordance with the converted target time value. The receiver may be in the form of a transceiver as described further below. The slave device preferably comprises means for performing or participating in any method as set out above.

The invention further provides a computer readable medium comprising software code adapted when executed on a data processing device to perform any method as set out above or as described below, and a device, system or apparatus having means, preferably in the form of a processor with associated memory and/or a transceiver, for performing any method as set out above or as described below.

Any feature in one aspect of the invention may be applied to other aspects of the invention, in any appropriate combination. In particular, method aspects may be applied to apparatus and computer program aspects, and vice versa.

Furthermore, features implemented in hardware may generally be implemented in software, and vice versa. Any reference to software and hardware features herein should be construed accordingly.

Preferred features of the present invention will now be described, purely by way of example, with reference to the accompanying drawings, in which.

OVERVIEW

This disclosure presents techniques for delivering a high-precision time signal to a number of independent nodes simultaneously—i.e. synchronized. In some embodiments, the accuracy of deliveries of this synchronized time signal (at multiple nodes simultaneously) that can be achieved are of the order of 8 ns down to 500 ps, and even below.

Figure 1:
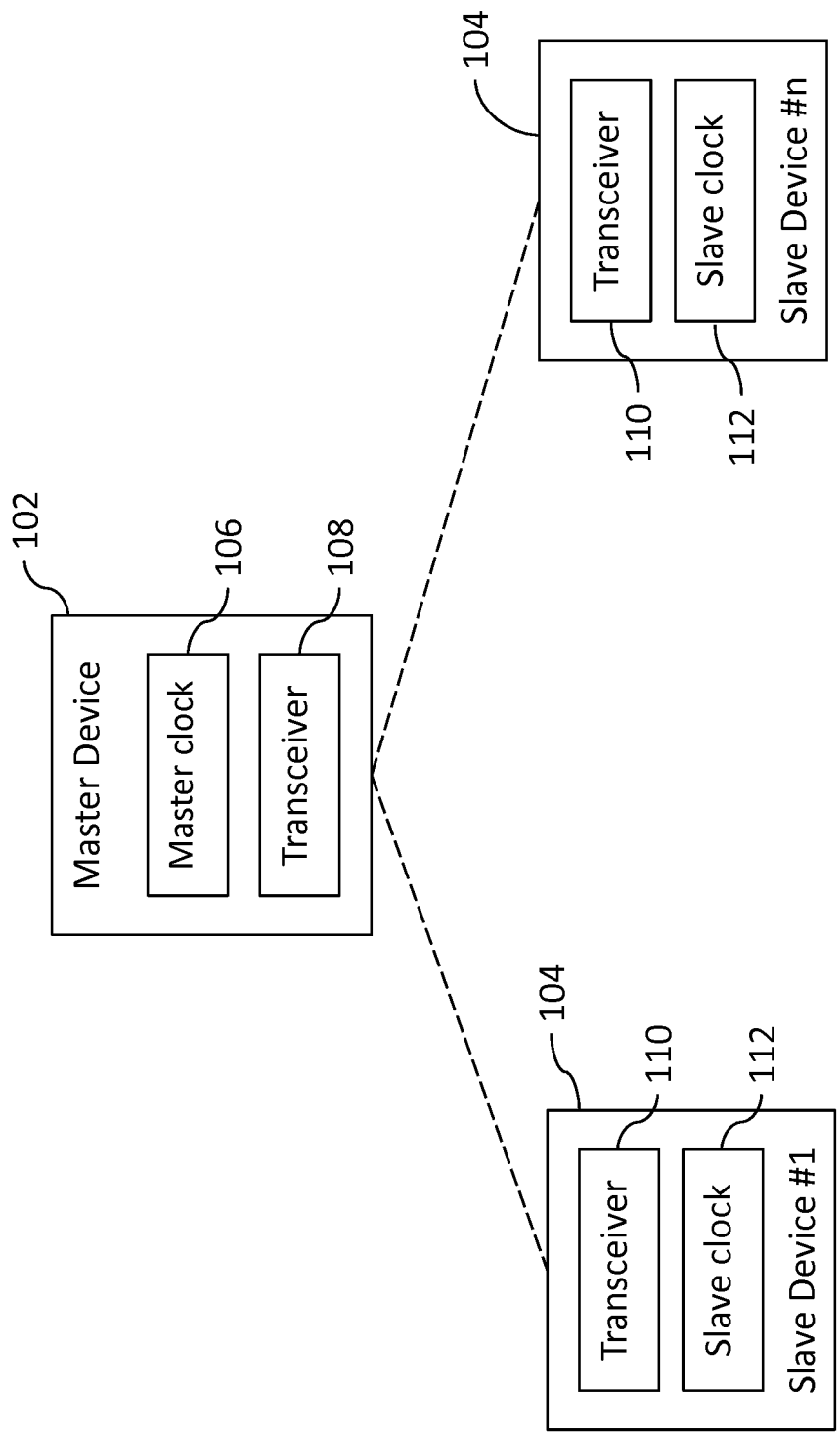
FIG. 1 illustrates a wireless communication system having a master device and multiple slave devices.

A system in accordance with an embodiment is shown in FIG. 1 and includes a master device 102 and any number of slave devices 104 which communicate wirelessly. The master device includes a master clock 106 providing a master time signal. The master clock defines the time base of the master device, with time values expressed in relation to that time base at the master device. Note that instead of a local clock locally generating the master time signal the master time signal could itself be sourced from a remote clock or time signal source. The master device further includes a wireless transceiver 108 for communicating with slave devices 104. Slave devices 104 each include a similar wireless transceiver 110 for communicating with the master device and a local slave clock 112. The slave clock defines a time base for time measurements at the slave device and is specific to a particular slave. The slave clocks are thus not inherently synchronized to the master device clock 106 or to each other.

Master and slave devices typically include other components, such as processors, microcontrollers and the like, the exact details of which will depend on the nature and purpose of the devices. For example, the master and/or slave devices may be computing or communications devices, display devices, user input devices, control devices, sensor devices or any other type of device that may have a need to operate in accordance with synchronized timing information.

In embodiments described herein, the transceivers 108, 110 in the master and slave devices are DW1000 Ultra-Wide Band (UWB) transceivers, available from Decawave Ltd (of Dublin, Ireland). While these embodiments use the capabilities of the DW1000 UWB transceiver, they could be implemented using any transceiver device with similar capabilities.

Embodiments utilise the following transceiver capabilities:
  Sending messages with data payload
  Receiving messages and the data payload
  Timestamping message transmission time
  Timestamping message reception time
  Control of the time a message is sent.
  Optionally, to physically deliver the signal, the capability may be provided to:
   Control the time a physical signal is generated—e.g. an edge on a digital output pin.

The precision achievable in the system is typically dependent (at least in part) on the precision of the timing of the above items.

Decawave's DW1000 UWB transceiver device is capable of the above to a precision of 8 ns and better as follows:
 1. The DW1000 is clocked at 128 MHz which gives an 8 ns clock period which means that events (like a transmission) can be controlled to happen deterministically and synchronously to these 8 ns boundaries, i.e. the actual variability of the event is of the order of a some small number of hundreds of picoseconds over PVT (process, voltage, temperature), and this variation can be kept to less than perhaps 200 ps via device calibration.
 2. The DW1000 receiver can timestamp message reception interpolating between sample points to give a receive timestamp precision with a standard deviation in the order of a few hundred picoseconds, again with calibration over PVT to keep the error consistent with temperature and voltage variations.
 3. The DW1000 can be programmed with a transmission time that is precisely controlled to start on one of its 8 ns boundaries such that a transmission time-stamp can be pre-determined, and/or pre-computed, and included into the transmitted message, with the aforementioned (at point 1 above) precision.
 4. The DW1000 can similarly generate a digital output signal at a preselected time (in 8 ns units), where the output's time relationship to the 8 ns boundary can similarly be determined/calibrated to achieve the precision as per point 1 above.

Synchronization System

Each DW1000 transceiver contains a "system time" register that increments in a defined way depending on the mode of operation of the DW1000. This register increments at a nominal frequency of 125 MHz (a period of 8 ns) in units of 512; so the bottom 9 bits are zero. These bottom 9 bits are supplied by the DW1000 receiver for each valid receive frame to give an accurate time stamp.

Time synchronization involves the synchronization of this system time, or at least the accurate establishment and tracking of the error in the system time, between a master node and a slave node.

The master node and slave node have free-running system times that are not synchronized in any way. In typical embodiments, each node includes a DW1000 IC (integrated circuit) and an associated microcontroller (which can be a general purpose processor or a dedicated microcontroller depending on the desired architecture).

Figure 2:
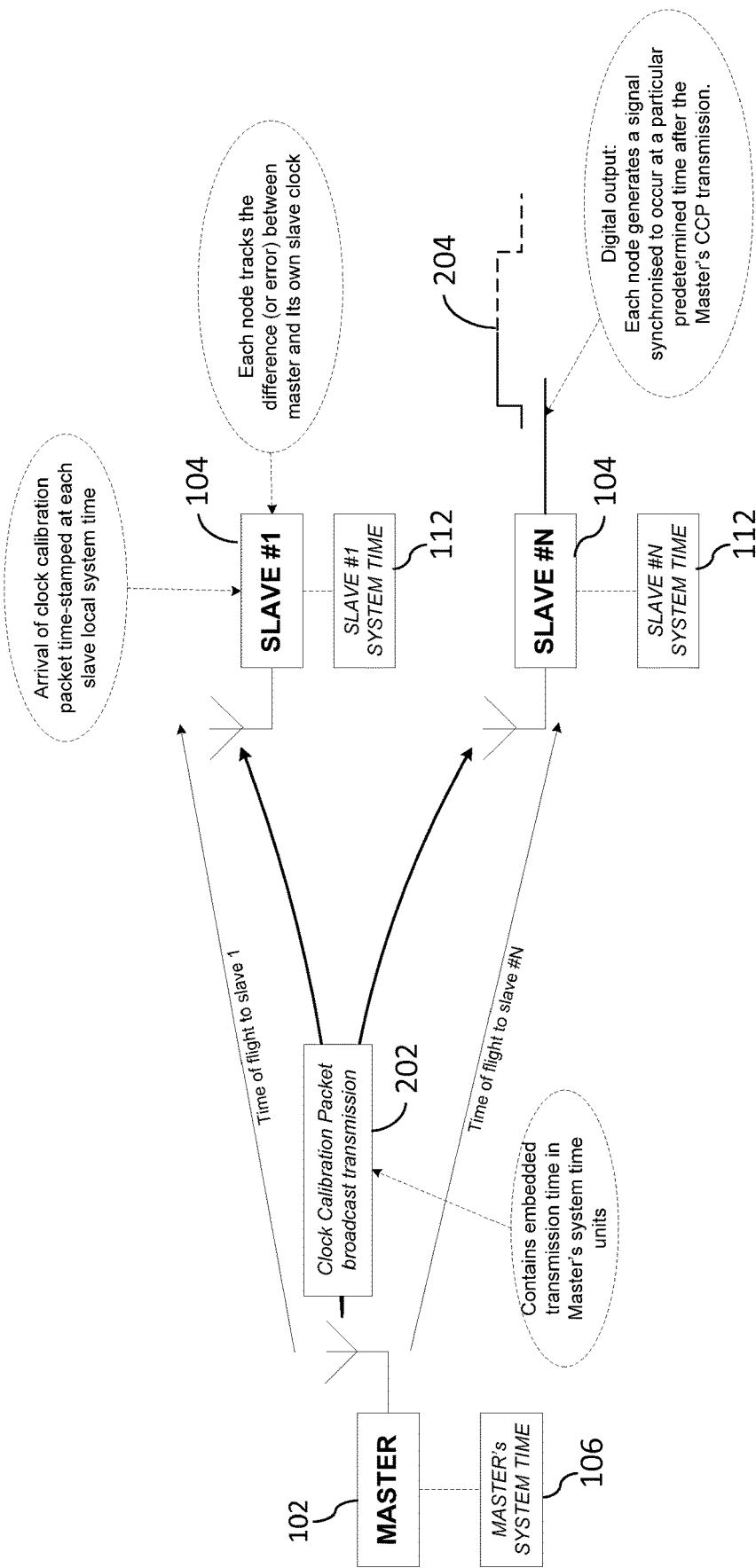
FIG. 2 illustrates the operation of a synchronization system.

The synchronization process is illustrated in FIG. 2.

As a basis for synchronization, the master node 102 broadcasts periodic calibration frames 202, herein called clock calibration packets (CCP), with a pre-computed transmission time of each frame embedded in the frame payload. This time is designated $MT_i$ where the subscript indicates that it changes for each transmission as time passes. Each $MT_i$ is expressed in the master's time base, and is thus in units counted at the clock rate of the master based on the master's system time 106.

Typically the period between CCP transmissions would be expected to be in the range from 200 ms down to 500 µs, this being chosen depending on the synchronization interval required, the transmit message duration and the processing time in the master and slave nodes (e.g. time before they are ready for the next message), and the time for any other processing/messaging in the nodes.

Each slave (in range of the master) receives and precisely timestamps the arrival of the CCP. This time will be designated $SR_i$, and is expressed relative to the slave's time base, in units counted at the clock rate of each individual slave node (based on the respective slave node's system time 112). Each slave also retrieves the corresponding $MT_i$ from the received CCP 202.

Each slave tracks the variation in its local clock with respect to the master's clock using the MT and SR times from successive CCP messages, so that it can convert between time values in the master's clock time domain and time values in its local time domain. This clock tracking/ conversion process (described in more detail below) allows for timings at the slave device to be synchronized to the master device clock.

In particular, the synchronization may be used to generate a digital output signal 204 synchronized to the master's time base at one or more (or each) of the slave devices. For example a digital output may be generated simultaneously at multiple slave devices, synchronized to the master's time base. This is achieved as follows:

Each slave knows a target time delay, TTD, between the master's CCP transmission time and the delivery of the digital output signal that is to be delivered synchronously at all slaves. TTD is defined in units counted at the clock rate of the master.

Each slave then takes the $MT_i$ transmission time embedded in the CCP and adds the TTD value to determine a future event target time (i.e. the time at which some action or event is to occur at the slave device). The slave then converts the resultant (future) time to its own local slave time domain using the clock tracking/synchronization techniques described further below. This then is the synchronization time, which can be used in the slave device to perform some activity in synchronicity with the other slaves.

For instance, it can be used to program the preselected digital output signal so that it occurs at the same time in all slaves, for use by other equipment.

While the above example proposes using a relative TTD value, the future event target time could alternatively be specified by an absolute time value in the master's time base. In that case, the slave device would convert the target time directly, using the time base conversion derived from previous CCP messages.

Clock Tracking

As explained above, each slave tracks the variation in its local clock with respect to the master's clock using the MT and SR times from successive CCP messages, so that it can convert between time values in the master's clock time domain and time values in its local time domain. This can be done with linear interpolation or using clock tracking techniques such as a digital PLL (phase-locked loop), or using a Kalman filter.

A Kalman filter has been found to be an effective choice for implementing the clock tracking. In an embodiment using a Kalman filter implementation to perform clock tracking, the clock tracking function takes as inputs:

the CCP receive time ($SR_i$, specifying time of reception at the slave device in its time base)

the sum of the CCP transmission time ($MT_i$, from the master device in its time base) and the CCP time-of-flight (TOF)

The CCP TOF is essentially a fixed offset (for stationary master/slave devices) or dynamically measured offset (for moving master/slave devices) that results from the time of flight (TOF) of the CCP message between the master device and the slave device.

The time correction function uses the Kalman filter to convert the future event target time (e.g. $MT_i$+TTD) from the time base of the master device into the slave's local time base. It essentially uses the state of the Kalman filter (as updated with every CCP processed) to predict the slave clock value corresponding to the determined event target time.

One key element in the clock tracking is the time offset resulting from the physical propagation of the CCP message through the air, i.e. the time-of-flight (TOF). The TOF from the master is incorporated (subtracted) as part of the tracking conversion between the master's clock time domain and times in each slave's local time domain.

For many applications, the TOF is constant for static devices and needs to be determined just once, but where devices (master and/or slaves) are in motion the TOF will change as the distance from each slave to the master changes. Thus, for mobile nodes the TOF is determined periodically. This can be done (for instance) using two-way ranging techniques. Each slave periodically performs a (two-way ranging) measurement with the master to determine the TOF, the frequency of TOF measurement depending on the accuracy required and the speed of motion of the slave. An inertial measurement unit, IMU, might be used reduce the frequency of TOF measurements when nodes are not moving fast.

Further details of synchronization techniques that can be used or adapted for use in the present system can be found in patent publication US 2012/120874 A1 titled "Wireless Access Point Clock Synchronization System", the contents of which are herein incorporated by reference.

Synchronized Output Process

Figure 3:
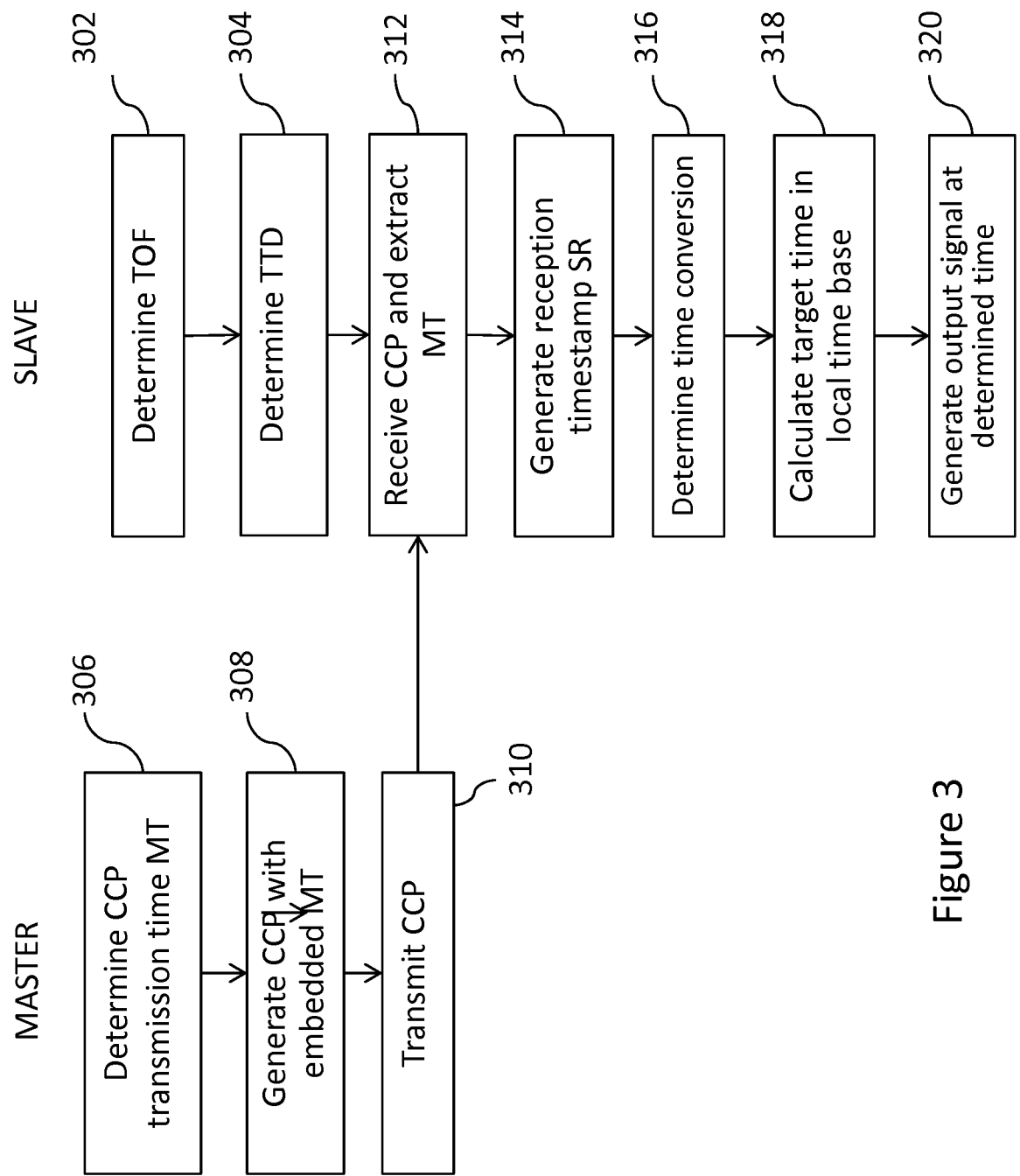
FIG. 3 illustrates a process for generating a synchronized output signal at a slave device.

The process of generating a synchronized output is summarised in FIG. 3 from the perspectives of the master device and an individual slave device. The slave device determines the time of flight (TOF) in step 302. This step may occur periodically at a determined frequency (e.g. for moving slaves), or just once (e.g. for stationary slaves), for example on startup. The TOF may be measured by the slave or alternatively may be measured at the master device and communicated to the slave device (e.g. in the CCP or separately). The TOF is used in the clock tracking process described previously.

In step 304, the slave device determines the target event time, e.g. as a target time delay (TTD) value. This may, for example, have been sent by the master device in an earlier message or may be configured at the slave device in some other way. In one example, the slaves could be configured to generate synchronised periodic events—e.g. at 100 Hz at the master clock rate. In that case the slave would be able to determine the TTD based on knowledge of when the last signal was generated and the required signal period. As a further example, the master could send a wireless command to tell the slaves that an event is coming up at an absolute time in the master's time base and the slaves then determine a relative TTD from that.

As mentioned above, the master node generates regular clock calibration packets which are transmitted to the slave node. The master node embeds the time of transmission, based on its local time base, into each of the calibration packets. To improve accuracy and account for delay between generation and transmission of the CCP, the master node preferably determines the intended transmission time (step 306) and embeds this into the generated CCP (step 308) and then configures the transceiver to transmit the CCP at the determined time (e.g. this may be done using a feature of the DW1000 known as "Delayed Send"). Transmission (step 310) then occurs at the configured time, ensuring the transmission timestamp is accurate.

At step 312, the slave node receives the CCP transmission and extracts the transmission timestamp. The slave node timestamps the message on arrival (step 314). This timestamp RS, is in the local time base of the slave. As a result, the slave node now has a copy of the time at the master when the message was sent; and a record of its own local time when the message arrived. The slave node determines a conversion (step 316) between the time bases, for example by determining the skew or time offset between the time base in the master and the time base in the slave based on the determined TOF. In one embodiment the (TOF-corrected) timestamps are provided as input to a Kalman filter or other estimating algorithm as described previously, with the Kalman filter determining the conversion between the time bases.

At step 318, the slave node adds the TTD time value to the CCP send timestamp $MT_i$ and converts the resulting future target time into the local slave time base using the determined conversion (e.g. the current state of the Kalman filter).

At step 320, the slave node waits until the determined future time (based on its local clock and the converted target time value) and performs the required action at that future time. In a particular example, the action is to generate a predetermined output signal. To ensure precise timing, the slave node preferably configures an output interface of the transceiver or of the slave node to generate the output signal at the specified time.

In the above examples, events (e.g. output of a particular signal) at the slave devices are synchronised to the master device clock. However, the master device knowing the TTD (or absolute target time) can also similarly generate its own event(s) (e.g. a digital output signal), simultaneously (synchronized with) the slave devices' events.

Timing Precision

In any radio transceiver device that may be used to embody the above technique, the events take place at some system time interval based on a digital system clock. In the case of the DW1000 this is 125 MHz giving an 8 ns clock period, and most events happen synchronously to this. The timing of the digital output produced is thus variable from 0 to 8 ns, from any time target with respect to the master device.

However, the precision of receive timestamps and the calculations to give the target transmission time can be much more precise, for the DW1000 typically to within a few hundreds of picoseconds.

More precise timing (than 8 ns) can be achieved by providing the lost precision (fraction of the 8 ns) as a separate output e.g. as an encoded number presented on 3 to 5 lines of a parallel output port (e.g. corresponding to a number of least-significant bits of a time signal). This is illustrated in FIG. 4.

In the case of a DW1000 based embodiment of the technique the fractional information can be used to generate appropriately delayed versions of the digital output to give better than 8 nanosecond precision, or even sub-nanosecond precision. For example, this can be achieved by providing a TTD value with greater precision or providing the TTD value to the 8 ns precision together with an additional fractional time value corresponding to the sub-8 ns portion. This offset can be added to the target time before or after conversion to the local slave time domain.

Figure 4:
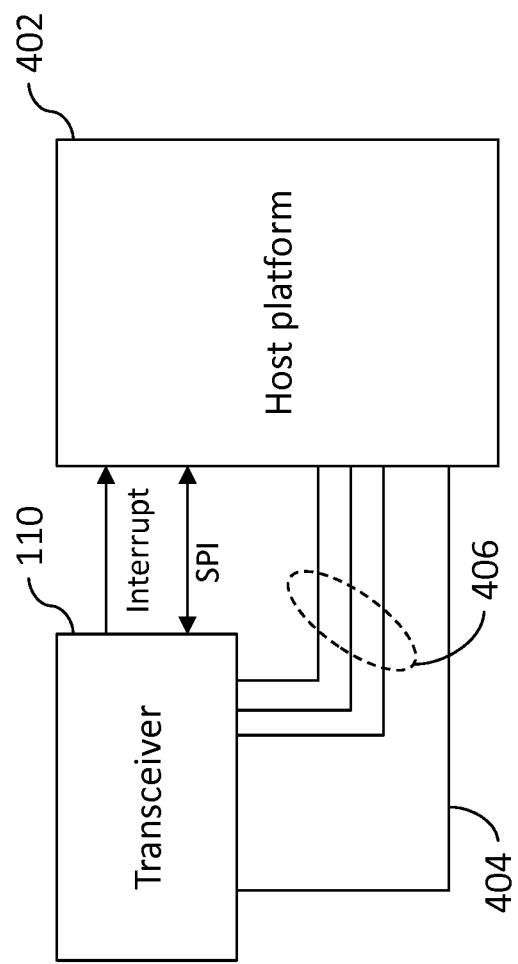
FIG. 4 illustrates provision of timing information from a transceiver to a host processor.

In the FIG. 4 example, the slave transceiver 110 generates a hardware signal 404 aligned to the 8 ns boundary of the slave clock (in the case of a DW1000 transceiver). The signal is generated as indicated above, based on the CCP messages and known TTD/target time using the time domain conversion as described, and is provided to the host platform 402 (e.g. a device processor). An additional timing signal 406 of n bits (here n=3) is supplied to the host platform over additional lines. This additional timing signal may have been sent by the master device. The host platform can utilise the additional timing signal as an offset to the 8 ns clock boundary to compute a more precise timing for carrying out some action or generating a further output signal.

Enhancements

In certain embodiments (typically where there are a small number of slave devices) it is possible to incorporate the functionality of the CCP into a message from the master that is part of a two-way ranging exchange that also gives the slaves an instantaneous TOF.

Assuming that the delay through the RF channel remains constant for the whole two-way ranging exchange, and since the receive time at the slave is naturally part of the TOF measurement, then the TOF may be taken as the TOF for that CCP packet. Thus, while the TOF may be wrong from the point of view of a location system, it is the correct TOF for the CCP clock tracking (and is typically immune to non-line-of-sight (NLOS) related errors).

When TTD is a system constant the events are generated simultaneously synchronized (to the achievable timing precision) at all nodes. Where there is a requirement to have synchronized events with different time offsets at individual nodes, the TTD at those nodes may be individually set to give the required time offsets.

The described synchronization methods may be used to enable actions to be performed synchronously at a number of wirelessly connected devices, for example by generating a precisely synchronised signal output at a predetermined future time at each of the devices.

In one example, the method may be applied in a virtual reality system comprising a wireless headset display and multiple wireless input devices, such as handheld virtual reality/game controllers. Other application examples could include home automation or industrial automation (for example synchronizing control signals sent to sensors, actuators, downstream control devices etc.)

In summary, disclosed embodiments provide a technique which involves using a clock tracking system, such as Kalman filter, digital PLL or linear interpolation, to convert a future event target time specified in a time base of a (remote) master device into the local unsynchronized time bases of one or more slave devices and each slave generating an event signal at the converted time, such that a coordinated delivery of synchronized signals is achieved.

The technique may also take into account the individual propagation times between the master device and the slave devices.

In some case, the propagation times may be frequently measured to correct for their variation as conditions change.

In some cases, two-way ranging techniques may be used to measure the propagation times. The system may be a wireless system. In some cases, the system may use ultra-wideband (UWB) radio.

However, while the described embodiments employ wireless communications, the described synchronization system could also be applied in devices using wired communication.

The invention claimed is:

1. A method of synchronizing signals, the method comprising:
   receiving a clock calibration message at each of one or more slave devices from a master device, the clock calibration message comprising a transmission timestamp indicating a transmission time of the clock calibration message in a time base of the master device;
   using a clock tracking system to record the transmission timestamp in the time base of the master device and record a reception timestamp of reception of the clock calibration message in local unsynchronized time bases of the one or more slave devices;

using the clock tracking system to convert a future event target time specified in the time base of the master device into the local unsynchronized time bases of the one or more slave devices based on the recorded transmission timestamp and reception timestamp; and generating, by each of the one or more slave devices, an event signal at the converted time, such that a coordinated delivery of synchronized signals is achieved.

2. The method of claim 1, further comprising converting the future event target time into the local unsynchronized time bases of a plurality of slave devices, wherein the generating step is performed by each of the plurality of slave devices.

3. The method of claim 2, further comprising performing the conversion using the clock tracking system at each slave device based on a respective local clock of the slave device.

4. The method of claim 1, wherein the clock tracking system comprises a Kalman filter, digital phase-locked loop (PLL) or linear interpolation.

5. The method of claim 1, further comprising taking into account individual propagation times between the master device and each of the one or more slave devices when generating the event signal.

6. The method of claim 5, further comprising measuring the individual propagation times periodically to correct for their variation as conditions change.

7. The method of claim 5, further comprising using one or more two-way ranging techniques to measure the propagation times.

8. The method of claim 1, further comprising determining, at the slave device, a reception timestamp in the slave device's time base indicating a time of reception of the calibration message.

9. The method of claim 8, further comprising using the transmission timestamp and the reception timestamp to determine a conversion between the time base of the master device and the time base of the slave device and using the determined conversion to convert the future event target time.

10. The method of claim 9, further comprising receiving a plurality of clock calibration messages with respective transmission timestamps, determining respective reception timestamps for each clock calibration message, and determining the conversion using the plurality of transmission timestamps and reception timestamps.

11. The method of claim 1, further comprising determining the conversion based on a time-of-flight, TOF, value indicating a time for the clock calibration message to travel from the master device to the slave device.

12. The method of claim 11, further comprising subtracting the TOF value from the reception timestamp or adding the TOF value to the transmission timestamp, and analyzing the resulting timestamps to determine a conversion or mapping which maps time values between the master and slave time bases.

13. The method of claim 11, wherein the conversion is based on an estimation algorithm, preferably a Kalman filter, the method comprising determining the conversion by providing one or more transmission timestamps in the master time base and one or more corresponding reception timestamps in the slave time base as input to the estimation algorithm, preferably after modifying either the transmission timestamp(s) or the reception timestamp(s) based on the TOF value.

14. The method of claim 13, wherein converting the future event target time comprises providing the future event target time as input to the estimation algorithm, the estimation algorithm calculating a corresponding event target time in the time base of the slave device.

15. The method of claim 11, further comprising determining the TOF value based on a ranging exchange between the master device and the slave device.

16. The method of claim 15, wherein the clock calibration message is embedded in a message transmitted as part of the ranging exchange.

17. The method of claim 16, further comprising:
computing the future event target time based on a predetermined target time delay, TTD, value, wherein the TTD value specifies a time offset relative to the transmission timestamp of the clock calibration message, the computing preferably comprising adding the TTD value to the transmission timestamp to determine the future event target time; and
converting the computed future event target time to the slave device's time base.

18. The method of claim 16, wherein the future event target time comprises a predetermined absolute time value in the master device's time base.

19. The method of claim 17, wherein the future event target time or TTD value is pre-configured at the slave device and/or communicated to the slave device by the master device.

20. The method of claim 1, wherein the event signal is generated periodically at the slave device(s), the future event target time determined based on the signal period and/or a previous signal output time.

21. The method of claim 1, wherein the master clock updates at a given frequency determining a time interval between successive clock increments, the method comprising providing to the slave device(s) additional timing information at greater time resolution, indicating an offset with respect to values of the master clock, and determining the future event target time and/or the converted time using the additional timing information.

22. The method of claim 1, further comprising configuring, in advance of the converted future time, a signal interface at the slave node to generate the event signal at the converted future time.

23. The method of claim 1, further comprising determining respective different future event target times at each of a plurality of slave devices, optionally as time offsets relative to a single future target time value, and performing the conversion and generating steps at each slave device based on the respective future event target time for the slave device to generate event signals at respective different converted event times.

24. The method of claim 1, further comprising performing an action or generating a local event signal at the master device at the future event target time, whereby the action or signal is synchronized with the generation of event signals at the slave device(s).

25. The method of claim 1, further comprising, by a slave device, outputting the event signal to a processor of the slave device.

26. The method of claim 1, wherein the master device is remote from, and/or connected wirelessly to, the slave devices.

27. The method of claim 1, wherein the method is used in a wireless system.

28. The method of claim 27, wherein the method is performed using ultra-wideband (UWB) radio.

29. The method of claim 1, wherein the coordinated delivery of synchronized signals is achieved with a precision of 8 nanoseconds (ns) or better.

* * * * *